United States Patent
Carlson

(10) Patent No.: US 9,754,090 B2
(45) Date of Patent: Sep. 5, 2017

(54) SETTING UP A SYSTEM WITH A MOBILE DEVICE

(71) Applicant: Vivint, Inc., Provo, UT (US)

(72) Inventor: Richard Scott Carlson, Orem, UT (US)

(73) Assignee: Vivint, Inc., Provo, UT (US)

( * ) Notice: Subject to any disclaimer, the term of this patent is extended or adjusted under 35 U.S.C. 154(b) by 40 days.

(21) Appl. No.: 14/272,119

(22) Filed: May 7, 2014

(65) Prior Publication Data

US 2015/0324210 A1    Nov. 12, 2015

(51) Int. Cl.
  *G06F 21/31*    (2013.01)
  *G06F 9/44*    (2006.01)
  *G06F 13/38*    (2006.01)
  *G06F 11/32*    (2006.01)

(52) U.S. Cl.
  CPC ............ *G06F 21/31* (2013.01); *G06F 9/4411* (2013.01); *G06F 11/32* (2013.01); *G06F 11/328* (2013.01); *G06F 13/38* (2013.01); *G06F 13/385* (2013.01); *G06F 11/324* (2013.01); *G06F 2221/2141* (2013.01)

(58) Field of Classification Search
  CPC ...... G06F 9/4411; G06F 21/31; G06F 13/385; G06F 11/328; G06F 2221/2141; G06F 9/44; G06F 11/32; G06F 13/38; G06F 11/324
  See application file for complete search history.

(56) References Cited

U.S. PATENT DOCUMENTS

| | | | |
|---|---|---|---|
| 6,564,056 B1 * | 5/2003 | Fitzgerald | H04L 12/2803 340/5.1 |
| 7,664,707 B2 * | 2/2010 | Adams | G06Q 10/00 705/51 |
| 7,908,401 B2 * | 3/2011 | Chang | G06F 13/385 709/220 |
| 8,311,513 B1 * | 11/2012 | Nasserbakht | G06Q 10/109 455/410 |
| 8,447,696 B2 * | 5/2013 | Adams | G06Q 10/00 705/51 |
| 8,974,544 B2 * | 3/2015 | Hubner | G06F 21/31 709/221 |
| 9,204,298 B2 * | 12/2015 | Frew | H04L 9/3215 |
| 9,507,950 B2 * | 11/2016 | Brown | G06Q 10/00 |
| 9,524,174 B2 * | 12/2016 | Wintzell | G06F 9/4411 |
| 2004/0125782 A1 * | 7/2004 | Chang | G06F 13/385 370/338 |
| 2005/0246243 A1 * | 11/2005 | Adams | G06Q 10/00 705/55 |
| 2008/0062258 A1 * | 3/2008 | Bentkovski | G08B 13/19695 348/50 |
| 2008/0204199 A1 * | 8/2008 | Howarth | G08B 13/2417 340/10.1 |
| 2009/0023395 A1 * | 1/2009 | Chang | G06F 13/102 455/74.1 |

(Continued)

*Primary Examiner* — Joseph P Hirl
*Assistant Examiner* — Stephen Gundry
(74) *Attorney, Agent, or Firm* — Holland & Hart, LLP

(57) ABSTRACT

Methods and systems are described for setting up a security and/or automation system. According to at least one embodiment, a method for setting up the security or automation system includes receiving a communication from a mobile device associated with installing a system peripheral device at a control unit and executing an installation task based on the communication.

16 Claims, 12 Drawing Sheets

(56) References Cited

U.S. PATENT DOCUMENTS

| | | | |
|---|---|---|---|
| 2010/0031371 A1* | 2/2010 | Adams | G06Q 10/00 726/27 |
| 2010/0094981 A1* | 4/2010 | Cordray | G06F 15/177 709/222 |
| 2011/0145927 A1* | 6/2011 | Hubner | G06F 21/31 726/26 |
| 2013/0067551 A1* | 3/2013 | Frew | H04L 9/3215 726/7 |
| 2013/0171981 A1* | 7/2013 | Woo | G08C 17/02 455/420 |
| 2013/0254437 A1* | 9/2013 | Brown | G06Q 10/00 710/36 |
| 2013/0304795 A1* | 11/2013 | Kang et al. | 709/202 |
| 2013/0311684 A1* | 11/2013 | Dabbiere | G06F 13/14 710/36 |
| 2014/0040989 A1* | 2/2014 | Davis | H04L 63/08 726/4 |
| 2014/0098247 A1* | 4/2014 | Rao et al. | 348/207.1 |
| 2014/0245765 A1* | 9/2014 | Chen et al. | 62/129 |
| 2014/0266669 A1* | 9/2014 | Fadell et al. | 340/501 |
| 2014/0304632 A1* | 10/2014 | Ryu | G06F 3/04817 715/765 |
| 2014/0313048 A1* | 10/2014 | Sabata | H04Q 9/00 340/870.01 |
| 2014/0344454 A1* | 11/2014 | Kawamura et al. | 709/224 |
| 2015/0033305 A1* | 1/2015 | Shear | G06F 21/45 726/6 |
| 2015/0052578 A1* | 2/2015 | Yau et al. | 726/3 |
| 2015/0061859 A1* | 3/2015 | Matsuoka | G08B 27/00 340/501 |
| 2015/0081928 A1* | 3/2015 | Wintzell | G06F 9/4411 710/8 |
| 2015/0097689 A1* | 4/2015 | Logue | G08B 25/10 340/632 |
| 2015/0100618 A1* | 4/2015 | Le Guen et al. | 709/201 |
| 2015/0109104 A1* | 4/2015 | Fadell | G08B 27/003 340/5.65 |
| 2015/0163412 A1* | 6/2015 | Holley et al. | 348/143 |
| 2015/0177705 A1* | 6/2015 | Mylet | 700/214 |
| 2017/0046173 A1* | 2/2017 | Moraes | G06F 13/38 |
| 2017/0048712 A1* | 2/2017 | Brown | G06Q 10/00 |

* cited by examiner

SETTING UP A SYSTEM WITH A MOBILE DEVICE

BACKGROUND

Security systems and building automation systems often include multiple peripheral devices that can communicate with at least one other device. Generally, these devices are part of a wireless network that is distributed throughout a building that uses the system. For example, a security system may include a motion detector that is in communication with an alarm device that can trigger an alarm if the motion detector receives a stimulus that indicates an intruder is on the premise. In such an example, the motion detector and the alarm device can communicate with each other over the network.

During the installation of a peripheral device, such as a motion detector described above, the peripheral device has to be recognized by the network so that it can communicate with the other devices in the network. This may include inputting an identification code into a control unit of the network that represents the peripheral device.

SUMMARY

Methods and systems are described for setting up a security and/or automation system. According to at least one embodiment, a computer-implemented method for setting up the security or automation system includes receiving a communication from a mobile device associated with installing a system peripheral device at a control unit and executing an installation task based on the communication. In some embodiments, the method further includes receiving a second communication associated with installing the system peripheral device from the system peripheral device at the control unit. In some cases, the second communication may include a peripheral identifier code. The installation task may be executed based on the communication of the first and second communications. In at least one example, the method includes sending instruction back to the mobile device. In some instances, such instructions may include commands to display a status of the installation task in a display of the mobile device.

The system peripheral device may be a security camera, a motion detector, a security sensor, another type of security device, or combinations thereof. In yet other examples, the system peripheral device may be a climate control device, a building automation device, another type of automation device, or combinations thereof.

In one example, the installation task may include adding the system peripheral device to the network controlled with the control unit. In other examples, the installation task includes removing the system peripheral device from the network controlled with the control unit. In yet other examples, the installation task may include changing a configuration of the system peripheral device. The communication from the mobile device may include instructions to assign a name to the system peripheral device. Also, the instructions may include identifying a location of the system peripheral device. Further, the instructions may include associating an identification code with the system peripheral device.

In one instance, the method further includes authenticating that an operator of the mobile device has permissions to make changes to the system. In at least one case, the communications from the mobile device are routed through a cloud based device.

In another aspect of the principles described herein, a computing device is configured for setting up a security and/or building automation system. The computing device includes a processor, memory in electronic communication with the processor, and instructions stored in the memory. The instructions are executable by the processor to receive a communication from a mobile device associated with installing a system peripheral device at a control unit and to execute an installation task based on the communication.

In yet another aspect of the principles described herein, a computer program product is for setting up a security and/or building automation system. The computer-program product includes a non-transitory computer-readable medium having instructions thereon. The instructions are executable by a processor to receive a first communication from a mobile device associated with an installation task for a system peripheral device at a control unit, to receive a second communication associated with the installation task from the system peripheral device at the control unit, and to execute the installation task based on the first communication and the second communication.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
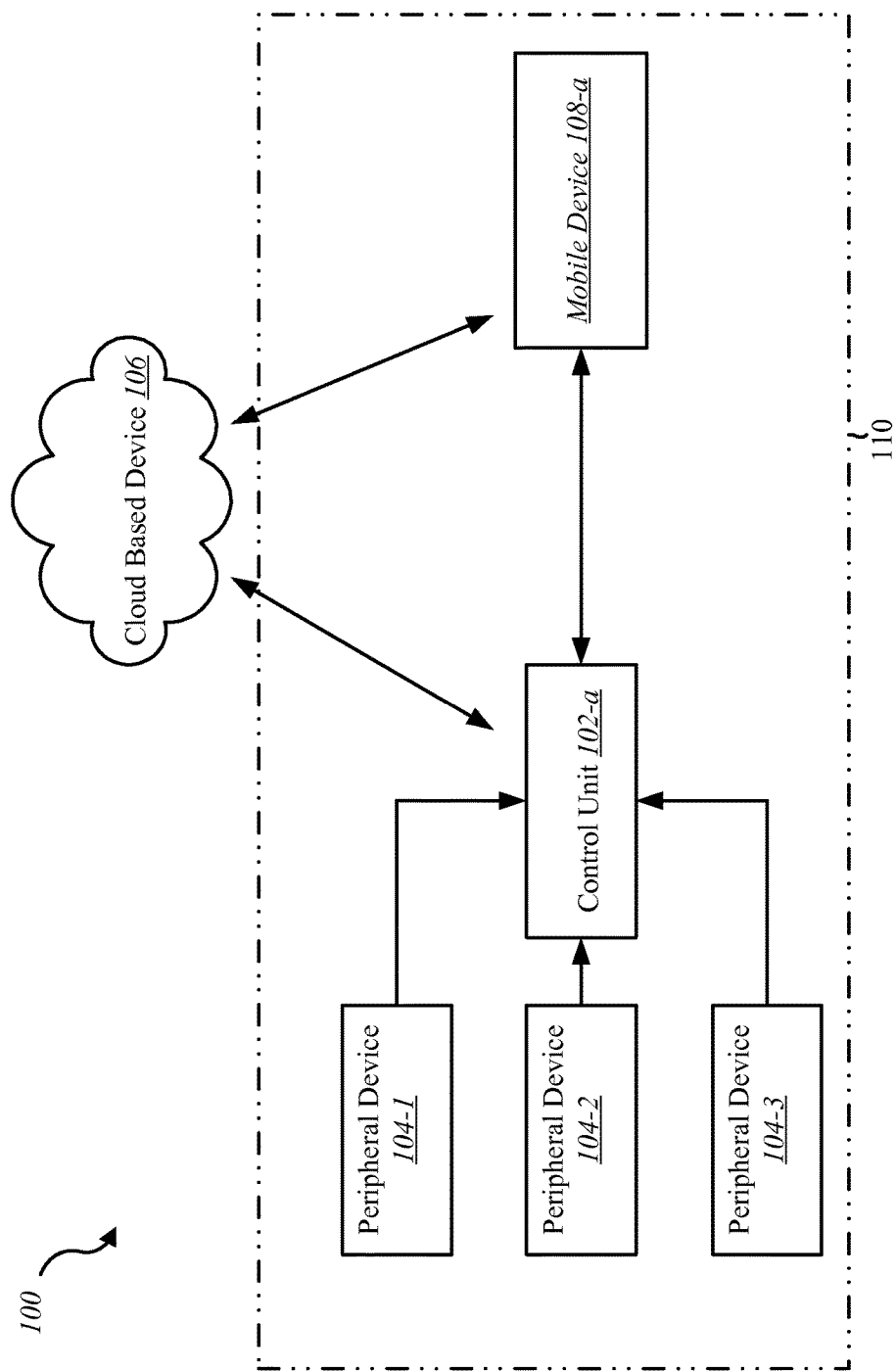
FIG. 1 is a block diagram of an example of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. More specifically, the systems and methods described herein relate to an improved arrangement for setting up a security and/or building automation system. The principles described herein minimizes the amount of time that it takes to set up the system by reducing an installer's travel time between a control unit and the peripheral device being installed into the system. A mobile device may provide a user interface that communicates with the control unit so that the installer can input commands for the control unit through the mobile device while standing adjacent to the peripheral device being installed.

As used herein, the term "module" includes a combination of hardware and programmed instructions that are necessary for performing the designated function of the module. Components of the modules may be located on the same physical device or some of the components may be located at remote locations that are in communication with the other components of the module.

FIG. 1 is a block diagram depicting one embodiment of an environment 100 in which the present systems and methods may be implemented. In some embodiments, the environment 100 includes a control unit 102-a that is in communication with multiple peripheral devices 104-1, 104-2, 104-3. The control unit 102-a is also in communication with a mobile device 108-a. The control unit 102-a may be in direct communication with the mobile device 108-a or in communication with the mobile device 108-a through an intermediate device, such as a cloud based device 106.

The control unit 102-a may control at least a part of the security or automation system. For example, each of the peripheral devices 104-1, 104-2, 104-3 may send information to the control unit 102-a where the signals are processed. The peripheral devices 104-1, 104-2, 104-3 may include, for example, a camera sensor, audio sensor, forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, heartbeat sensor, breathing sensor, oxygen sensor, carbon dioxide sensor, brain wave sensor, movement sensor, voice sensor, other types of sensors, actuators, or combinations thereof.

These peripheral devices 104-1, 104-2, 104-3 may send raw information to the control unit 102-a where no processing has occurred prior to sending the information to the control unit 102-a. In other examples, at least a portion of the information is processed prior to sending the information to the control unit 102-a. In some cases, at least most of the processing occurs at the control unit 102-a.

The control unit 102-a may make decisions based on these communications from the peripheral devices 104-1, 104-2, 104-3. For example, based on the information sent from the peripheral devices 104-1, 104-2, 104-3 to the control unit 102-a, the control unit 102-a may make a decision to activate an alarm, adjust a climate control setting, open or close a window, lock or unlock a door, control a security parameter, manage energy consumption, check the status of a door, locate a person or item, control lighting, control cameras, receive notifications regarding a current status or anomaly associated with a building, perform another task, or combinations thereof. In some cases, a decision may be decided at one of the peripheral devices 104-1, 104-2, 104-3, and the peripheral device may or may not notify the control unit 102-a of the decision and/or resulting action.

In some examples, the control unit 102-a includes a user interface where the user can interact with the control unit 102-a. For example, the user can manually give instructions to the control unit 102-a to adjust a network setting, install a peripheral device 104, or perform another system task.

The mobile device 108-a may be in communication with the control unit 102-a. For example, an installer of a peripheral device 104 may communicate with the control unit 102-a through the mobile device 108-a to perform installation tasks that the installer could perform while being present at the control unit 102-a. However, by using the mobile device 108-a to control the installation tasks the installer can perform the installation task remotely from the control unit 102-a. In some instances, the control unit 102-a is physically connected to the room in a home (i.e. wall mounted computing device) or part of personal computer (i.e. desktop computer), and an installer is physically installing a new peripheral device 104 in another room away from the room where the control unit 102-a is located. The installer may physically attach the peripheral device 104 to the other room, such as mounting the peripheral device on a wall of the other room. With both the control unit 102-a and the peripheral device 104 physically installed at a distance from each other, the user would generally have to walk back and forth between the control unit 102-a and the peripheral device 104 to manually input information displayed on the peripheral device 104 into the control unit 102-a. However, with a mobile device 108-a configured to be an extension of the control unit's installation program, the installer can remain at the peripheral device 104 and send the desired information to the control unit 102-a through the mobile device 108-a without having to walk to the control unit 102-a thereby saving the installer time.

The installer may perform any appropriate installation task affecting the system with the mobile device 108-a. For example, the installer may add a peripheral device 104 to the system, remove a peripheral device 104 from the system, change a peripheral device configuration, identify a location of the peripheral device 104, assign a name to the peripheral device 104, associate an identifier code with the peripheral device 104, perform another task involved with installing the peripheral device 104, or combinations thereof.

Any appropriate mechanism for communicating between the control unit 102-*a* and the mobile device 108-*a* may be used. In some examples, a wireless network is utilized to communicate between the control unit 102-*a* and the mobile device 108-*a*. Examples of networks that may be used include, but are not limited to local area networks (LAN), wide area networks (WAN), virtual private networks (VPN), wireless networks (using 802.11, for example), and/or cellular networks (using 3G and/or LTE, for example), Bluetooth networks, z-wave networks, other types of networks, or combinations thereof.

Any appropriate type of mobile device may be used to communicate with the control unit 102-*a*. For example, an application may be downloaded to a smart phone, an electronic tablet, a laptop, another type of mobile device, or combinations thereof. In some embodiments, the mobile device 108-*a* is a portable electronic device with a touch screen display.

Such an application may be specifically configured to communicate with the control unit 102-*a* to perform installation tasks. In some examples, the application is an extension of the control unit's installation program. In other examples, the application of the mobile device 108-*a* sends installation requests to the control unit 102-*a* that are processed and executed by the control unit 102-*a*.

Figure 2:
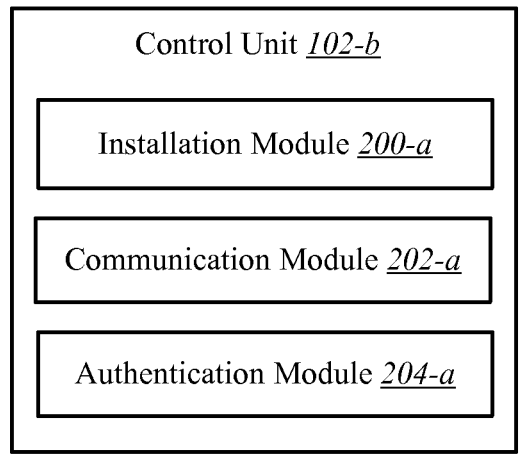
FIG. 2 is a block diagram of an example of a control unit of the environment shown in FIG. 1.

FIG. 2 is a block diagram illustrating one example of a control unit 102-*b*. In this example, the control unit 102-*b* has an installation module 200-*a*, a communications module 202-*a*, and an authentication module 204-*a*. Any appropriate type of control unit may be used. For example, the control unit may be a primary control unit, a secondary control unit, another type of control unit, or combinations thereof.

The installation module 200-*a* can be configured to perform any appropriate task associated with installing or uninstalling a peripheral device 104. For example, installation tasks may include adding a peripheral device 104 to the system, removing a peripheral device 104 to the system, changing a configuration of a peripheral device 104, assigning a name to a peripheral device 104, associating an identification code with a peripheral device 104, identifying a location of a peripheral device 104, other installation tasks, or combinations thereof.

The control unit 102-*b* may include a user interface and a display that allows a user to manually input information into the control unit 102-*a* at the control unit's physical location. Thus, the installation tasks may be controlled through the mobile device 108 or directly at the control unit 102-*b*.

The communications module 202-*a* may be configured to control communications between the control unit 102-*b* and a mobile device 108. For example, the communications module 202 may include the hardware and program instructions necessary to allow the control unit 102-*b* and mobile device 108 to communicate with each other. The communications module 202-*a* may include transceivers, response protocols, mechanisms for determining that communications are coming from the mobile device 108, other features, and combinations thereof.

The authentication module 204-*a* may include any appropriate mechanism for determining that a communication from a mobile device 108 has a user with permissions to make the requested changes to the system. In one example, the authentication module 204-*a* comprises an assumption that a mobile device 108 that is authorized to make changes to the system will be used by an operator who has the appropriate permissions. In such an embodiment, the authentication module 204 confirms that an identifier code from the mobile device 108 is associated with a mobile device 108 authorized to make the requested changes without performing further tasks to determine whether the mobile device's user also has permissions to make the system changes.

In another example, the authentication module 204-*a* requests a passcode to be sent through the mobile device 108 to determine whether the user of an authorized mobile device 108 has permissions to make changes to the system. In such an example, if the passcode sent through the mobile device 108 is correct, the authentication module 204-*a* may allow the control unit 102-*b* to process the installation instructions from the mobile device 108. In other examples, a speech command, a voice recognition mechanism, a finger print scanning mechanism, a retina scanning mechanism, another type of mechanism, or combinations thereof may be used as part of the authentication process.

The authentication process may include identifying whether the person using the mobile device 108 is an end user or an installer. The installer may have permissions to make changes to the system that the end user may not have. For example, the installer may have permission to install peripheral devices and/or make changes to the peripheral device's configurations while the end user does not. By restricting the permissions to add devices and change configurations, the system is protected from an end user inadvertently making inappropriate changes to the system. Thus, the authentication module 204-*a* may have a first process for authenticating an end user and a second process for authenticating an installer.

In some examples, the installer is authenticated before the installer performs any installation tasks during a session. However, in other examples, the installer is authenticated for each installation task. In such an example, the mobile device 108 or the control unit 102-*b* through the mobile device 108 may request an authorization code prior to executing the requested installation task. In some instances, some installation tasks can be performed by the end user, while others are not. In such a situation, some of the installation tasks may call for authentication while other installation tasks do not.

The authentication module 204-*a* may deny requests to make changes to the system if the user of the mobile device 108 fails to provide an appropriate passcode, fails to provide an appropriate username, or fails another type of authentication process. In the event that the mobile device's user fails a predetermined number of authentication attempts, the mobile device 108 may lock down, send a notification to the end user, send an unauthorized use notification to a system distributor, execute another type of remedial action, or combinations thereof.

Figure 3:
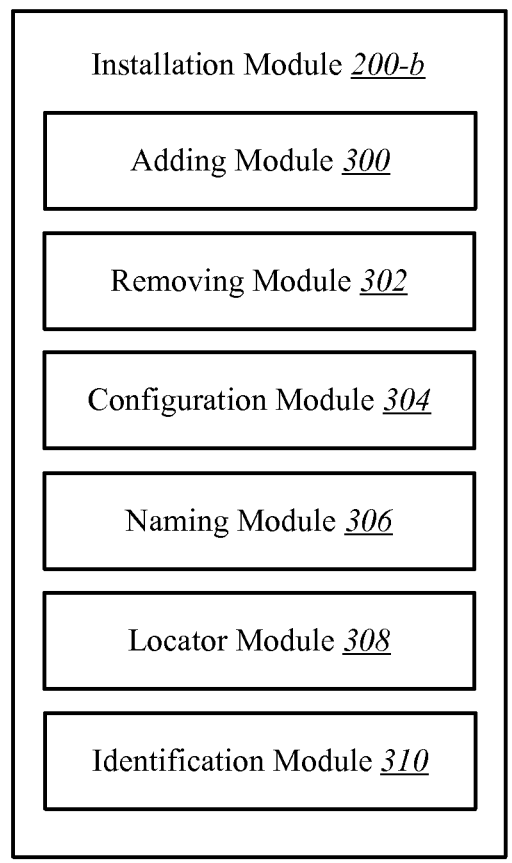
FIG. 3 is a block diagram of an example of an installation module of the control unit of FIG. 2.

FIG. 3 is a block diagram illustrating one example of an installation module 200-*b*. In this example, the installation module 200-*a* has an adding module 300, a removing module 302, a configuration module 304, a naming module 306, a locator module 308, and an identification module 310.

The adding module 300 is configured to add a peripheral device 104 into the system. When a peripheral device 104 is added to the system, the other system components, such as the control unit 102 recognize the newly added peripheral device 104 as part of the network.

The identification module 310 may work with the adding module 300 to associate an identification code with a peripheral device 104 to be added to the network. For example, the installer may request to add the peripheral device 104 through the mobile device 108. In response, the control unit 102 may solicit through the mobile device 108 an identification code that identifies the peripheral device 104. Such an identification code may be displayed in the peripheral device 104. In such an example, the installer may cause the control unit 102 to obtain the identification code in any appropriate manner.

For example, the installer may input the identification code into the mobile device 108 and cause the mobile device 108 to send the inputted identification code to the control unit 102. In another example, the installer can notify the control unit 102 through the mobile device 108 that the peripheral device 104 will send a signal from the peripheral device 104 that includes the identification code. In such an example, the installer may activate the peripheral device 104 such that the peripheral device 104 broadcasts a signal that can be picked up by the control unit 102. If the peripheral device 104 is a motion detector, the installer may wave his or her hand in front of the motion detector so that the hand waving motion is picked up by the motion detector and the signal is broadcasted. In response to receiving the broadcasted signal, the control unit 102 may copy the identification code and store the identification code in a table that associates the identification code with the peripheral device 104.

The naming module 306 may associate a name with the peripheral device 104. In one example, the installer can input a name into the mobile device 108 that can be included in the table that associates the identification code with the peripheral device 104. The name may be a user friendly name such as "front door motion detector" to assist the installer or ultimately an end user of the system in selecting the peripheral device 104 from a list of devices in the system. In some examples, the installer has an option to select a name from multiple name choices. However, in other examples, the mobile device 108 and/or control unit 102 provide a free text field where the installer is free to create the name.

The locator module 308 allows the installer to identify the location of the peripheral device 104 so that the control unit 102 understands where the peripheral device 104 is located. The mobile device 108 may include a field that allows the installer to input the peripheral device's location, and the mobile device 108 can send the location to the control unit 102. By identifying the peripheral device's location, the control unit 102 is enabled to identify the location of a sensed condition for the end user.

The removing module 302 allows the installer to remove a peripheral device 104 from the system. In some examples, the installer may be called upon to remove a peripheral device 104 from a system in response to determining that a peripheral device 104 is not functioning properly. In other examples, the installer may desire the ability to remove a peripheral device 104 from the system if mistakes are made during the installation process, and the installer wishes to start over. A display of the mobile device 108 may give the user an option to dissociate the peripheral device 104 from the system.

The configuration module 304 may allow the installer to make changes to the peripheral device 104 and/or record the configuration settings with the control unit 102. For example, the peripheral device 104 may include multiple settings that can be enabled or disabled based on the circumstances. For example, the peripheral device 104 may incorporate both a temperature sensor and a smoke detector. The configuration module 304 can allow the user to enable both the temperature sensor and the smoke detector, enable just one of the temperature sensor and the smoke detector, or neither the temperature sensor and the smoke detector. In another example, the peripheral device 104 may be a sensor that has the ability to be installed to different types of mounting surfaces, and the sensor may operate differently based on the selected type of mounting. The installer can use the configuration module 304 to select which settings are appropriate based on the selected type of mounting. In some instances, the configuration module 304 may cause a series of questions to appear in a display of the mobile device 108 to assist the installer in determining which configuration settings are appropriate for the circumstances of the peripheral device 104 being installed. Such questions may be generated based on the application installed on the mobile device 108. In such a circumstance, such questions may not be available to the installer if the installer used the control unit 102-*a* to change the configurations.

The changes to the configuration settings are also recorded locally with the control unit 102. With the configuration settings stored locally, the control unit 102 understands the type of signals being received from the peripheral device 104.

Figure 4:
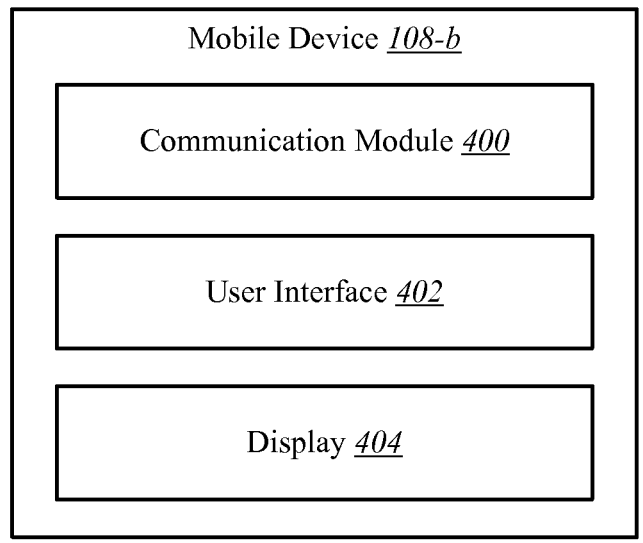
FIG. 4 is a block diagram of an example of a mobile device of the environment of FIG. 1.

FIG. 4 is a block diagram illustrating one example of a mobile device 108-*b*. In this example, the mobile device 108-*b* includes a communication module 400, a user interface 402, and a display 404.

The communication module 400 is configured to communicate with control unit 102. In response to receiving information inputted by the installer, the communication module 400 may send the inputted information to the control unit 102 where the installation task is performed. In some examples, a portion of the installation task is performed on the mobile device 108-*b* and is communicated to the control unit 102 where the control unit 102 finishes the installation tasks. For example, the mobile device 108-*b* may access a database associated with the system from the control unit 102, removable storage media, local memory, or a cloud based storage device. Based on the accessed information, the mobile device 108-*b* can determine how to change the configurations appropriately, and send instructions to the control unit 102 to make configuration changes as determined by the mobile device 108-*b*. In other examples, the mobile device 108-*b* may make determinations about adding and/or removing peripheral devices 104 from the system and those determinations in the form of instructions to the control unit 102 where such installation tasks are finished.

In some examples, the mobile device 108-*b* provides the same or similar functionality to the installer for executing installation tasks as is provided at the control unit 102. However, in other examples, the mobile device 108-*b* can provide additional functionality that is not available at the control unit 102. For example, some configuration settings may only be enabled or disabled through the mobile device 108-*b*. In other examples, the mobile device 108-*b* may enhance the installer's experience by providing a more friendly installation platform. In such an example, the mobile device 108-*b* may allow for display customization that can assist the installer. In such an example, the mobile device 108-*b* may provide options for changing the font size, background color, font color, font style, language, or other types of features. In other examples, the mobile device 108-*b* may provide a map of the system that depicts where in a building each of the peripheral devices 104 is located, and the control unit 102 does not provide such a map. In other examples, the mobile device 108-*b* may also include a location notification mechanism that allows the installer to know where the mobile device 108-*b* is located relative to a peripheral device 104. In some instances, the mobile device 108-*b* may have an ability to indicate to the installer which of the peripheral devices is nearest to the mobile device 108-*b*. In another example, the mobile device 108-*b* may include a camera that allows the mobile device 108-*b* to capture an image of the peripheral device 104.

The mobile device 108-*b* may include an application that recognizes the type of peripheral device 104 based on the captured image. This may allow the mobile device 108-*b* to identify for the user the type of peripheral device 104 and/or automatically pull up the information about the peripheral device 104. Further, a global positioning unit or another type of locating mechanism may allow the mobile device 108-*b* to determine the identification code of the peripheral device 104. As a result, such an application may save the installer time by having the mobile device 108-*b* look up the peripheral device's information and allow the installer to execute an installation task without having to navigate to the peripheral device 104. Such a feature may be useful if an installer returns to a peripheral device 104 to change a configuration setting or removes the peripheral device 104 from the system.

In some examples, the control unit 102 sends instructions to the mobile device 108-*b* indicating that the installation task is finished. In response to receiving such a notification, the mobile device 108-*b* may update a status of the installation task. In some examples, the mobile device 108-*b* tracks the installation status of each of the peripheral devices 104 in a system. In yet other examples, the control unit 102 tracks the installation status of each of the peripheral devices 104 in the system and sends the tracked information to the mobile device 108-*b* to display to the user.

In some instances, the display 404 of the mobile device 108-*b* may include a listing of each of the peripheral devices 104 that are currently associated with the system. An indicator associated with each of the peripheral devices 104 may indicate the peripheral device's installation status. For example, a green check icon next to one of the peripheral devices 104 in the listing may indicate that this particular peripheral device 104 is fully installed. Likewise, a red "X" icon may indicate that the completion process is either unfinished or not even started. Other icon shapes and symbols may be used to indicate a finished status, an unfinished status, an unstarted status, a removed status, an error status, a malfunctioning status, another type of status, or combinations thereof.

Any appropriate type of user interface 402 may be incorporated into the mobile device 108-*b* to operate the application that assists in the installation process. Such user interfaces may include a touch screen, a microphone, a key pad, a scroll button, or another type of user interface, or combinations thereof.

Figure 5:
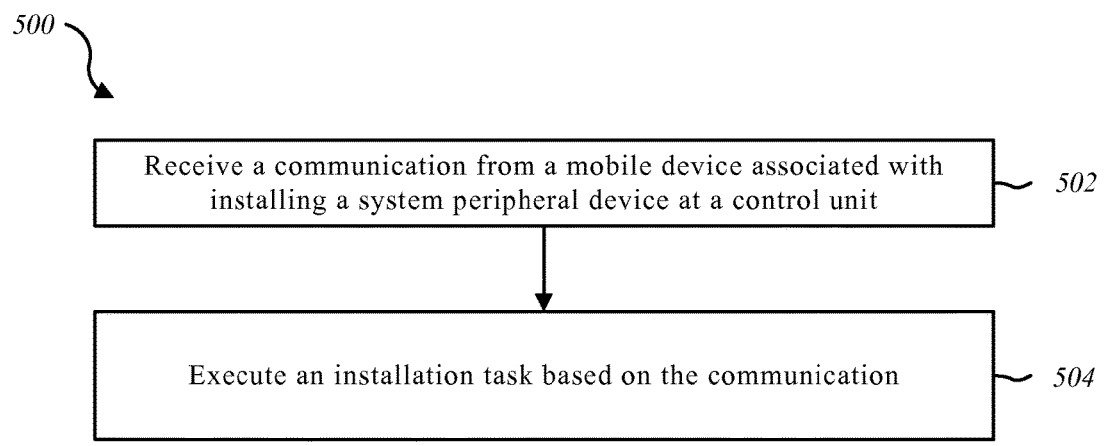
FIG. 5 is a flow diagram illustrating an example of a method for setting up a system.

FIG. 5 is a flow diagram illustrating one embodiment of a method 500 for setting up a security or building automation system. In this example, the method 500 includes receiving 502 a communication from a mobile device 108 associated with installing a system peripheral device 104 at a control unit 102 and executing 504 an installation task based on the communication. Such a method 500 may be implemented with a control unit 102 shown in FIGS. 1 and/or 2. In other examples, method 500 may be performed generally by the environment 100 shown in FIG. 1.

At block 502, a communication from a mobile device 108 may be received by the control unit 102. Such a communication may include instructions to execute an installation task. In some examples, the control unit 102 executes the entire installation task. In other examples, the control unit 102 executes just a portion of the installation task. In some instances, the mobile device 108 sends additional information to the control unit 102 than just instructions. For example, the mobile device 108 may send processed data or other information that can be used by the control unit 102 to execute the installation task.

The communication may include any appropriate amount of information structured in any appropriate format. In one instance, the communication may include a header addressed to the control unit 102, a mobile device identifier code, an installer identifier code, a peripheral device identifier code, and a set of instructions for an installation task.

At block 504, in installation task is executed based on the communication received at the control unit 102. The installation task may be any appropriate task associated with installing or uninstalling a peripheral device 104, changing a configuration of the peripheral device 104, or combinations thereof. A non-exhaustive list of installation tasks that may be executed by the control unit 102 based on the communication from the mobile device 108 includes adding a peripheral device 104 to the system, removing a peripheral device 104 from the system, changing a configuration of a peripheral device 104, assigning a name to a peripheral device 104, associating an identifier code with a peripheral device 104, identifying a location of a peripheral device 104, other types of installation tasks, and combinations thereof.

Figure 6:
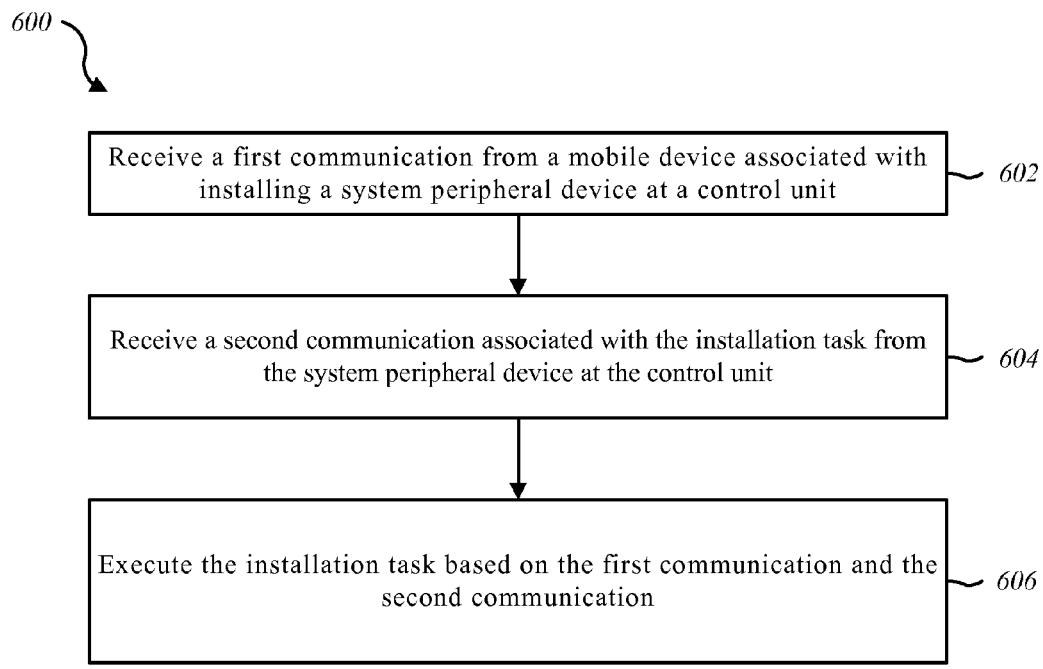
FIG. 6 is a flow diagram illustrating an example of a method for setting up a system.

FIG. 6 is a flow diagram illustrating one embodiment of a method 600 for setting up a security or building automation system. In this example, the method 600 includes receiving 602 a first communication from a mobile device 108 associated with installing a system peripheral device 104 at a control unit 102, receiving 604 a second communication associated with the installation task from the system peripheral device 104 at the control unit 102, and executing 604 an installation task based on the first communication and the second communication. Such a method 600 may be implemented with a control unit 102 shown in FIGS. 1 and/or 2. In other examples, method 600 may be performed generally by the environment 100 shown in FIG. 1.

At block 602, a communication from a mobile device 108 may be received by the control unit 102. Such a communication may include instructions to execute an installation task. In some examples, the control unit 102 executes the entire installation task. In other examples, the control unit 102 executes just a portion of the installation task. In some instances, the mobile device 108 sends additional information to the control unit 102 than just instructions. For example, the mobile device 108 may send processed data or other information that can be used by the control unit 102 to execute the installation task.

At block 604, a communication from a peripheral device 104 may be received by the control unit 102. Such a communication may include an identifier code of the peripheral device 104 or another type of information from the peripheral device 104.

At block 606, the control unit 102 can follow the instructions from the mobile device 108 with the peripheral device 104 associated with the identifier code received at the control unit 102. For example, the mobile device 108 may send an instruction to the control unit 102 to add a peripheral device 104 to the system, but the mobile device 108 may not identify the peripheral device 104 to be added. The installer may cause the peripheral device 104 to broadcast a signal that can be received by the control unit 102 and includes the peripheral device's identifier code. As a result, the control unit 102 can execute the installation task of adding the peripheral device 104 with the received identifier code to the system.

Figure 7:
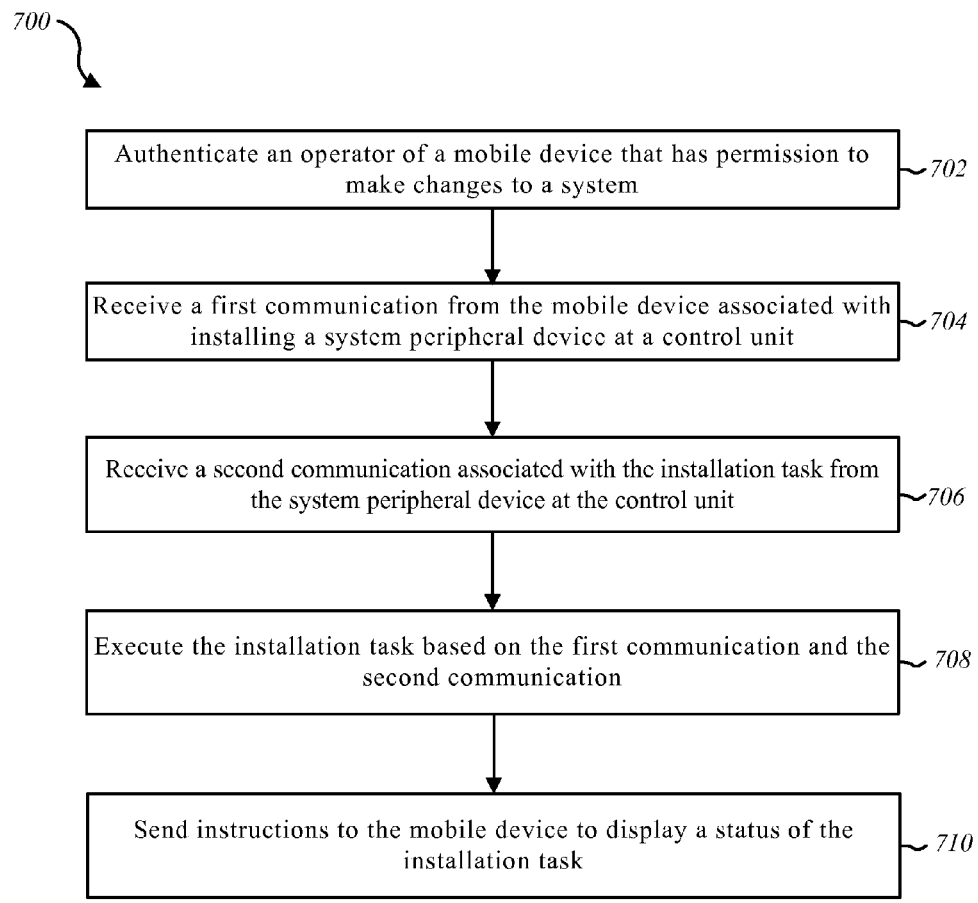
FIG. 7 is a flow diagram illustrating an example of a method for setting up a system.

FIG. 7 is a flow diagram illustrating one embodiment of a method 700 for setting up a security or building automation system. In this example, the method 700 includes authenticating 702 an operator of a mobile device 108 that has permission to make changes to a system, receiving 704 a first communication from a mobile device 108 associated with installing a system peripheral device 104 at a control unit 102, receiving 706 a second communication associated with the installation task from the system peripheral device 104 at the control unit 102, executing 708 an installation task based on the first communication and the second communication, and sending 710 instructions to the mobile device 108 to display a status of the installation task. Such a method 700 may be implemented with a control unit 102 shown in FIGS. 1 and/or 2. In other examples, method 700 may be performed generally by the environment 100 shown in FIG. 1.

At block 702, the operator of the mobile device 108 is authenticated if the operator has permissions to make changes to the system. Any appropriate authentication mechanism may be used in accordance with the principles described herein. For example, the operator may be prompted to enter a username, a passcode, another type of identifying information, or combinations thereof into the mobile device 108 as part of the authentication process. In some cases, the operator may be authenticated to make specific changes while being blocked from making other changes to the system.

While the example of FIG. 7 illustrates a specific flow of tasks to be performed as part of method 700, the tasks may occur in any appropriate order. As an example, the task of authenticating the operator may occur after the communication from the mobile device 108 is received by the control unit 102. In such an example, an operator may send a communication through the mobile device 108 to the control unit 102 to perform an installation task. In response, the control unit 102 may initiate an authentication procedure before executing the task. In other examples, the authentication procedures are performed prior to allowing the operator to send a communication to the control unit 102 with instructions to perform an installation task.

At block 710, instructions from the control unit 102 are sent to the mobile device 108 to display a status of the installation task. In response, the control unit 102 may present in a display whether the installation task is completed, pending, failed, another type of status, or combinations thereof. Such a feature may be beneficial to an installer who is installing multiple peripheral devices 104 throughout a building and wants to ensure that each of the peripheral devices 104 successfully installs.

Figure 8:
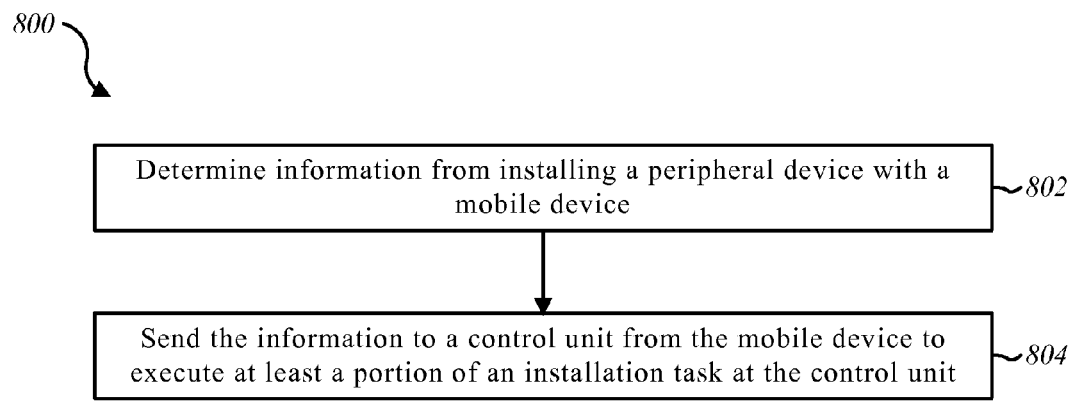
FIG. 8 is a flow diagram illustrating an example of a method for setting up a system.

FIG. 8 is a flow diagram illustrating one embodiment of a method 800 for setting up a security or building automation system. In this example, the method 800 includes determining 802 information from installing a peripheral device 104 with a mobile device 108 and sending 804 the information to a control unit 102 from the mobile device 108 to execute at least a portion of an installation task at the control unit 102. Such a method 800 may be implemented with a mobile device 108 shown in FIGS. 1 and/or 4. In other examples, method 800 may be performed generally by the environment 100 shown in FIG. 1.

At block 802, information about installing a peripheral device 104 is determined with a mobile device 108. An installer may command the mobile device 108 through a user interface to execute an installation task. In response to such a command, the mobile device 108 may determine what has to occur to cause the installation task to occur. For example, if the installation task is to add the peripheral device 104 to the system, the mobile device 108 may determine that the control unit 102 needs to receive the identifier code of the peripheral device 104. In response to determining that the control unit 102 needs the identifier code, the mobile device 108 may collect the identifier code for the control unit 102. This may occur by prompting the installer to input the identifier code into a user interface of the mobile device 108. In another example, the mobile device 108 may prompt the installer to trip the peripheral device 104 so that a signal that contains the identifier code is sent to the control unit 102. In examples where the mobile device 108 receives a command to change a configuration of a peripheral device 104, the mobile device 108 may decide which type of configuration options ought to be selected.

At block 804, the information is sent from the mobile device 108 to the control unit 102. The information may contain data that the mobile device 108 processed such as the appropriate configuration changes, instructions to execute particular installation tasks, other information, or combinations thereof. In some examples, the control unit 102 requests additional information from the mobile device 108. In such circumstances, the mobile device 108 may send multiple communications to the control unit 102 to cause the installation task to be executed.

Figure 9:
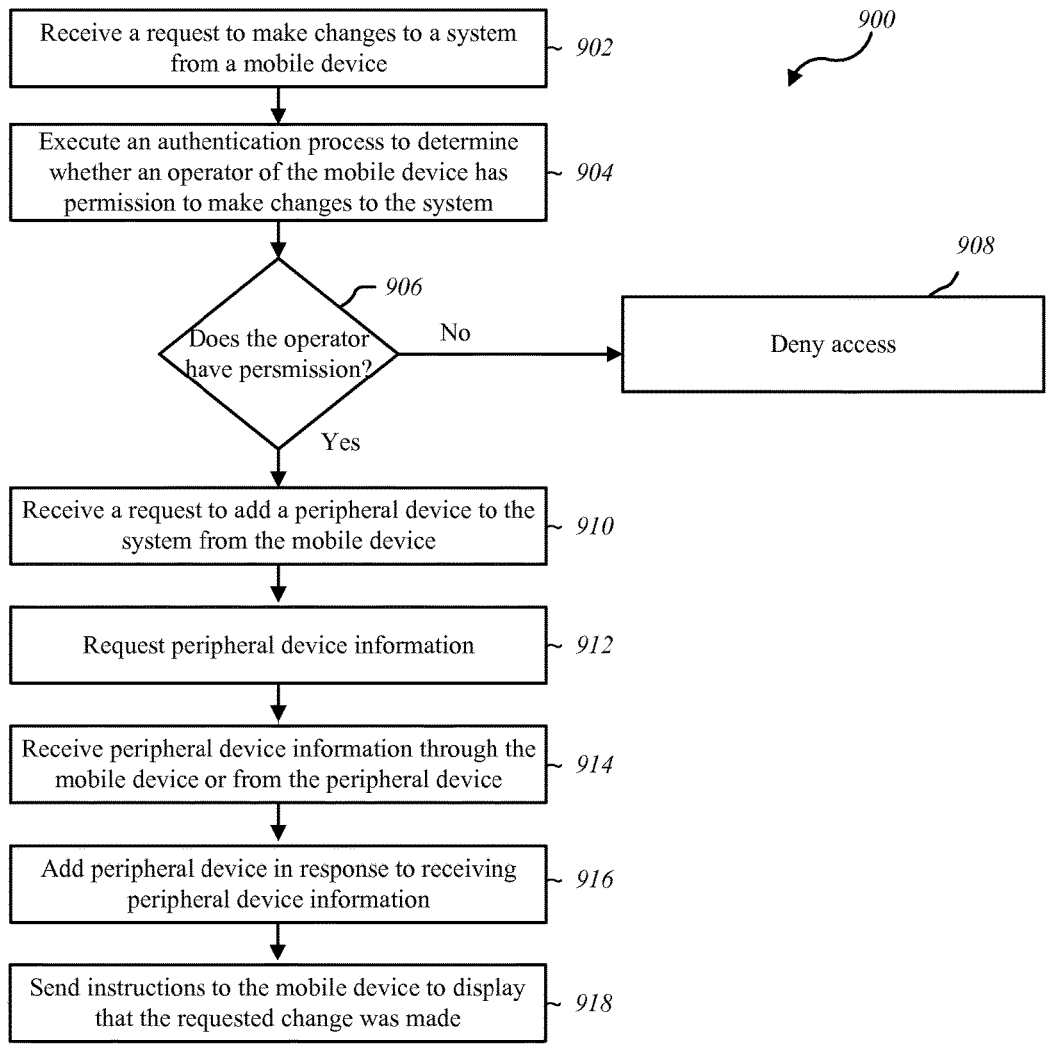
FIG. 9 is a flow diagram illustrating an example of a method for adding a peripheral device to a system.

FIG. 9 is a flow diagram illustrating one embodiment of a method 900 for setting up a security or building automation system. Such a method 900 may be implemented with a control unit 102 in FIGS. 1 and/or 2. In other examples, method 900 may be performed generally by the environment 100 shown in FIG. 1.

At block 902, a request to make changes to a system is received from a mobile device 108. At block 904, an authentication process is executed to determine whether an operator of the mobile device 108 has permission to make changes to the system. The process includes determining 906 whether the operator has permissions. If the user does not have permissions, access to the system is denied 908. On the other hand, if the operator is determined to have the appropriate permissions, the process includes allowing the process to continue.

At block 910, a request to add a peripheral device 104 to the system is received from the mobile device 108. In response, a request is sent back to the mobile device 108 to request 912 information about the peripheral device 104 to be added to the system. At block 914, the requested peripheral device information is received through the mobile device 108 from the peripheral device 104. The peripheral device 104 is added 916 to the system in response to receiving the peripheral device information, and instructions are sent 918 to the mobile device 108 to display that the requested change was made.

Figure 10:
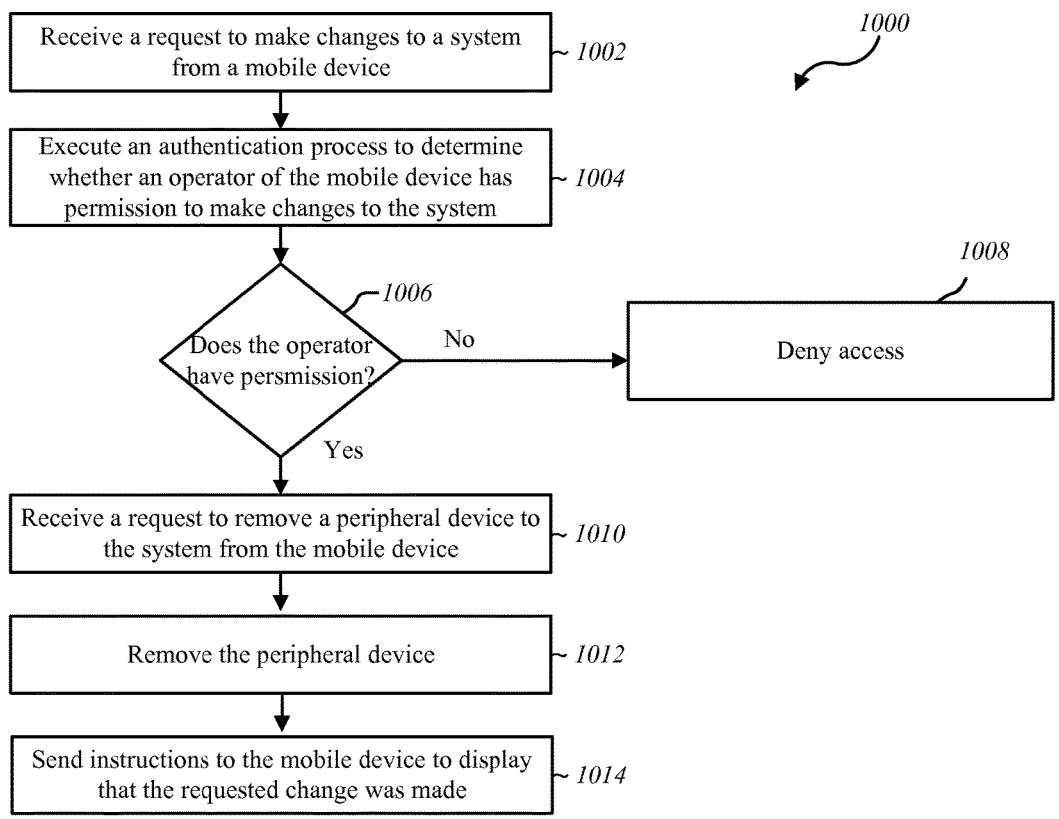
FIG. 10 is a flow diagram illustrating an example of a method for removing a peripheral device to a system.

FIG. 10 is a flow diagram illustrating one embodiment of a method 1000 for setting up a security or building automation system. Such a method 1000 may be implemented with a control unit 102 in FIGS. 1 and/or 2. In other examples, method 1000 may be performed generally by the environment 100 shown in FIG. 1.

At block 1002, a request to make changes to a system is received from a mobile device 108. At block 1004, an authentication process is executed to determine whether an operator of the mobile device 108 has permission to make changes to the system. The process includes determining 1006 whether the operator has the appropriate permissions.

If the user does not have the appropriate permissions, access to the system is denied 1008. On the other hand, if the operator is determined to have the appropriate permissions, the process includes allowing the process to continue.

At block 1010, a request to remove a peripheral device 104 to the system is received from the mobile device 108. In response, the peripheral device 104 is removed 1012 from the system. At block 1014, instructions are sent to the mobile device 108 to display that the requested change was made.

Figure 11:
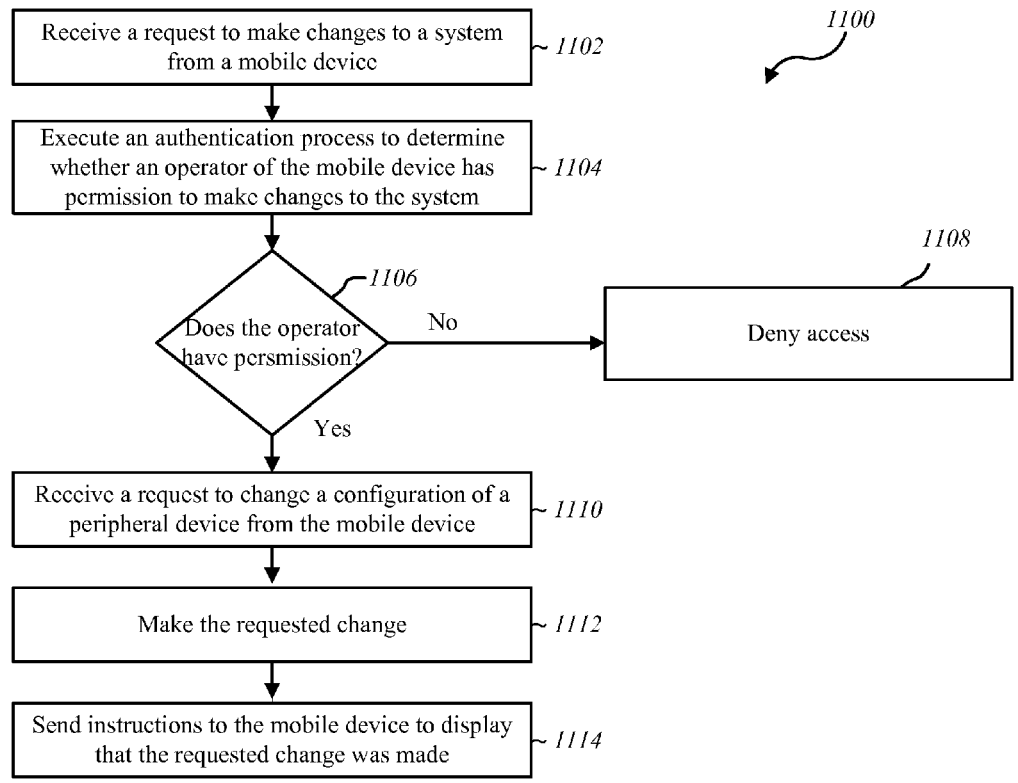
FIG. 11 is a flow diagram illustrating an example of a method for changing a configuration of a peripheral device to a system.

FIG. 11 is a flow diagram illustrating one embodiment of a method 1100 for setting up a security or building automation system. Such a method 1100 may be implemented with a control unit 102 in FIGS. 1 and/or 2. In other examples, method 1100 may be performed generally by the environment 100 shown in FIG. 1.

At block 1102, a request to make changes to a system is received from a mobile device 108. At block 1104, an authentication process is executed to determine whether an operator of the mobile device 108 has permission to make changes to the system. The process includes determining 1106 whether the operator has the appropriate permissions. If the user does not have the appropriate permissions, access to the system is denied 1108. On the other hand, if the operator is determined to have the appropriate permissions, the process includes allowing the process to continue.

At block 1110, a request to change a configuration of a peripheral device 104 is received from the mobile device 108. In response, the requested changes are made at the control unit 102. At block 1114, instructions are sent to the mobile device 108 to display the requested change was made.

Figure 12:
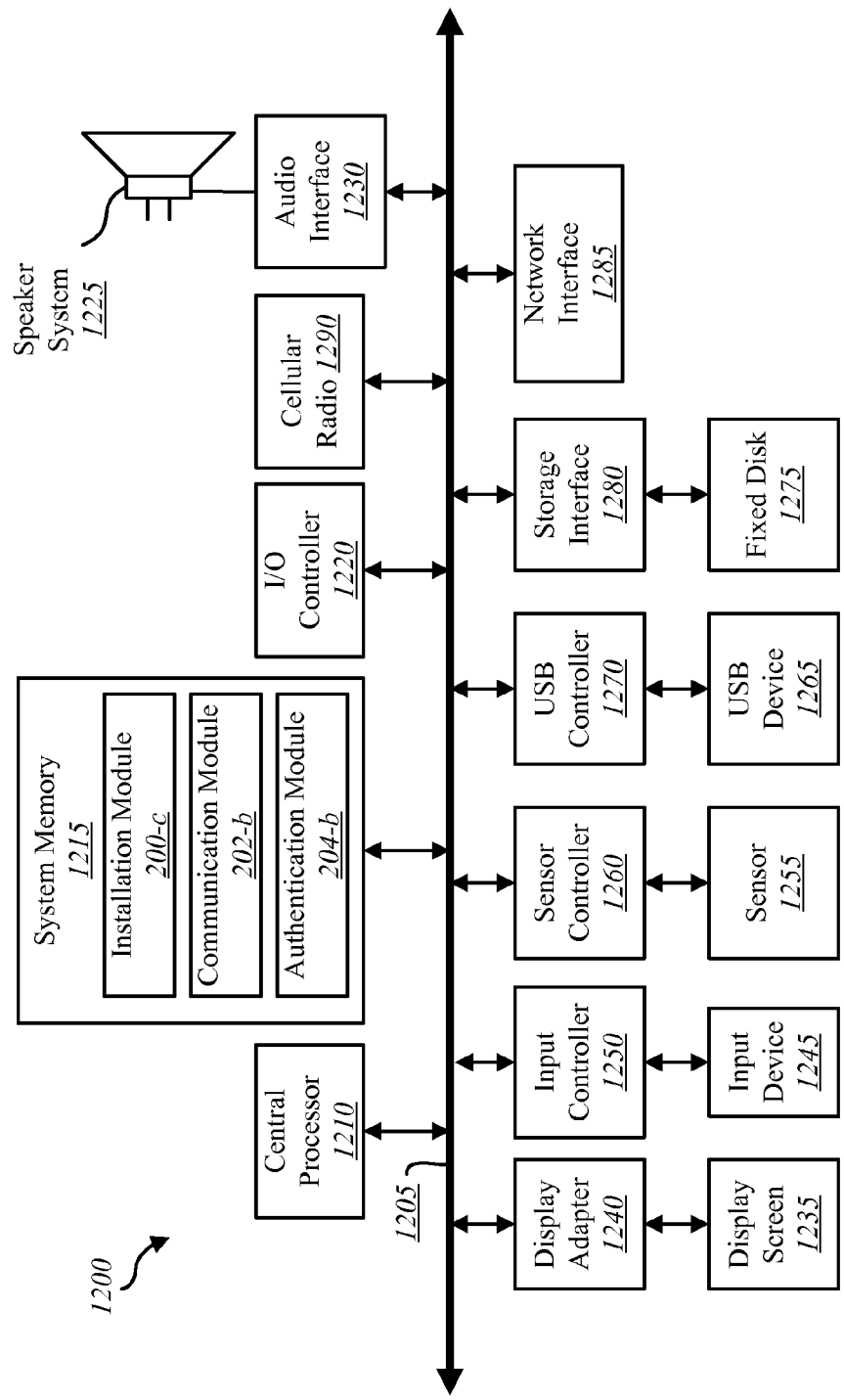
FIG. 12 is a block diagram of a computer system suitable for implementing the present systems and methods of FIG. 1.

FIG. 12 depicts a block diagram of a controller 1200 suitable for implementing the present systems and methods. The controller 1200 may be an example of the control unit 102, mobile device 108 in FIG. 1. In one configuration, controller 1200 includes a bus 1205 which interconnects major subsystems of controller 1200, such as a central processor 1210, a system memory 1215 (typically RAM, but which may also include ROM, flash RAM, or the like), an input/output controller 1220, an external audio device, such as a speaker system 1225 via an audio output interface 1230, an external device, such as a display screen 1235 via display adapter 1240, an input device 1245 (e.g., remote control device interfaced with an input controller 1250), multiple USB devices 1265 (interfaced with a USB controller 1270), one or more cellular radios 1290, and a storage interface 1280. Also included are at least one sensor 1255 connected to bus 1205 through a sensor controller 1260 and a network interface 1285 (coupled directly to bus 1205).

Bus 1205 allows data communication between central processor 1210 and system memory 1215, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, an installation module 200-c, a communications module 202-b, or an authentication module 204-b may be used to implement the present systems and methods may be stored within the system memory 1215. These modules may be an example of the modules illustrated in FIG. 2. Applications resident with controller 1200 are generally stored on and accessed via a non-transitory computer readable medium, such as a hard disk drive (e.g., fixed disk 1275) or other storage medium. Additionally, applications can be in the form of electronic signals modulated in accordance with the application and data communication technology when accessed via network interface 1285.

Storage interface 1280, as with the other storage interfaces of controller 1200, can connect to a standard computer readable medium for storage and/or retrieval of information, such as a fixed disk drive 1275. Fixed disk drive 1275 may be a part of controller 1200 or may be separate and accessed through other interface systems. Network interface 1285 may provide a direct connection to a remote server via a direct network link to the Internet via a POP (point of presence). Network interface 1285 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1200 wirelessly via network interface 1285. In one configuration, the cellular radio 1290 may include a receiver and transmitter to wirelessly receive and transmit communications via, for example, a cellular network.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 12 need not be present to practice the present systems and methods. The devices and subsystems can be interconnected in different ways from that shown in FIG. 12. The aspect of some operations of a system such as that shown in FIG. 12 are readily known in the art and are not discussed in detail in this application. Code to implement the present disclosure can be stored in a non-transitory computer-readable medium such as one or more of system memory 1215 or fixed disk 1275. The operating system provided on controller 1200 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method of setting up a security system and automation system, comprising:
   receiving, at a control unit, a first communication from a mobile device associated with installing a system peripheral device at the control unit, the first communication comprising a device identifier code;
   determining, at the control unit, whether the device identifier code indicates the mobile device is authorized to modify an aspect of the security system or automation system;
   upon determining the mobile device is unauthorized to modify an aspect of the security system or automation system, denying access;
   upon determining the mobile device is authorized to modify an aspect of the security system or automation system, determining whether the authorized mobile device is associated with an installer or an end user;
   executing, at the control unit, an installation task based at least in part on both the first communication and the determination the authorized mobile device is associated with the installer or the end user; and
   receiving, at the control unit, a second communication associated with installing the system peripheral device, the second communication being communicated by the system peripheral device, wherein the second communication includes a peripheral identifier code.

2. The method of claim 1, wherein the installation task includes adding the system peripheral device to a network controlled with the control unit.

3. The method of claim 1, wherein the installation task includes removing the system peripheral device from a network controlled with the control unit.

4. The method of claim 1, wherein the installation task includes changing a configuration of the system peripheral device.

5. The method of claim 1, further comprising authenticating that an operator of the mobile device has permissions to make changes to the system.

6. The method of claim 1, wherein the first communication includes instructions to assign a name to the system peripheral device.

7. The method of claim 1, wherein the first communication includes instructions to identify a location of the system peripheral device.

8. The method of claim 1, wherein the first communication includes instructions to associate an identification code with the system peripheral device.

9. The method of claim 1, further comprising sending instructions to the mobile device to display a status of the installation task.

10. The method of claim 1, wherein the system peripheral device is a security camera, a motion detector, a security sensor, or combinations thereof.

11. The method of claim 1, wherein the system peripheral device is a climate control device, a building automation device, or combinations thereof.

12. The method of claim 1, wherein receiving the first communication from the mobile device includes receiving the first communication through a cloud based device.

13. A computing device configured for setting up a security system and automation system, comprising:
   a processor;
   memory in electronic communication with the processor; and
   instructions stored in the memory, the instructions being executable by the processor to:
      receive a first communication from a mobile device associated with installing a system peripheral device at a control unit, the first communication comprising a device identifier code;
      determine whether the device identifier code indicates the mobile device is authorized to modify an aspect of the security system or automation system;
      upon determining the mobile device is unauthorized to modify an aspect of the security system or automation system, deny access;
      upon determining the mobile device is authorized to modify an aspect of the security system or automation system, determine whether the authorized mobile device is associated with an installer or an end user;

execute an installation task based at least in part on both the first communication and the determination the authorized mobile device is associated with the installer or the end user; and receive a second communication associated with installing the system peripheral device, the second communication being communicated by the system peripheral device, wherein the second communication includes a peripheral identifier code.

14. The computing device of claim 13, wherein the instructions are further executable by the processor to authenticate that an operator of the mobile device has permissions to make changes to the system.

15. The computing device of claim 13, wherein the instructions are further executable by the processor to send commands to the mobile device to display a status of the installation task.

16. A computer-program product for setting up a security system and automation system, the computer-program product comprising a non-transitory computer-readable medium having instructions thereon, the instructions being executable by a processor to:

determine, by a processor of a mobile device, information for installing a peripheral device in conjunction with a control unit, the first communication comprising a device identifier code;

determine whether the device identifier code indicates the mobile device is authorized to modify an aspect of the security system or automation system;

upon determining the mobile device is unauthorized to modify an aspect of the security system or automation system, deny access;

upon determining the mobile device is authorized to modify an aspect of the security system or automation system, determine whether the authorized mobile device is associated with an installer or an end user;

send the information to the control unit from the authorized mobile device, the information comprising a command to execute at least a portion of an installation task at the control unit and an indication of the determination the authorized mobile device is associated with the installer or the end user; and receive, from the system peripheral device, a second communication associated with installing the system peripheral device, wherein the second communication includes a peripheral identifier code.

\* \* \* \* \*